United States Patent [19]

Koshiishi

[11] Patent Number: 5,229,856
[45] Date of Patent: Jul. 20, 1993

[54] METHOD FOR THE CONTROL OF STROBOSCOPIC LIGHT USED IN ELECTRONIC STILL CAMERAS

[75] Inventor: Shinichirou Koshiishi, Hachioji, Japan

[73] Assignee: Ricoh Company, Ltd., Tokyo, Japan

[21] Appl. No.: 766,322

[22] Filed: Sep. 27, 1991

[30] Foreign Application Priority Data

Oct. 23, 1990 [JP] Japan .................. 2-283506
Oct. 23, 1990 [JP] Japan .................. 2-283507
May 8, 1991 [JP] Japan .................. 3-102799

[51] Int. Cl.$^5$ ............................ H04N 5/30
[52] U.S. Cl. .................. 358/209; 358/213.22; 358/909
[58] Field of Search ........... 358/209, 909, 213.19, 358/228, 229, 213.11, 213.22, 213.25; 354/140, 141

[56] References Cited

U.S. PATENT DOCUMENTS 4,860,108 8/1989 Saito et al. ............... 358/209
4,881,127 11/1989 Isoguchi et al. ........... 358/213.19

FOREIGN PATENT DOCUMENTS 63-223734 9/1988 Japan .
1-282976 11/1989 Japan .
2-130080 5/1990 Japan .

Primary Examiner—Michael T. Razavi
Assistant Examiner—Tuan V. Ho
Attorney, Agent, or Firm—Oblon, Spivak, McClelland, Maier & Neustadt

[57] ABSTRACT

An electronic still camera has a stroboscope, a video signal circuit composed of an image pickup element or a charge coupled device, a video signal processing section, an A/D converting section, a timing generator and a frame memory, a trigger timing generator, and a control circuit for controlling operations of the stroboscope, the video signal circuit and the trigger timing generator. A stroboscopic control method used in the electronic still camera has the steps of emitting light from the stroboscope in synchronization with video signals of first and second fields so as to provide an exposure with respect to each of the first and second fields of a frame picture image; and controlling exposure amounts for the first and second fields such that these exposure amounts are equal to each other. A stroboscopic synchronous operation at a frame-recording time is performed by a simplified control mechanism in a state in which there is a difference in time between the first and second fields, thereby performing a reliable exposure.

21 Claims, 6 Drawing Sheets

METHOD FOR THE CONTROL OF STROBOSCOPIC LIGHT USED IN ELECTRONIC STILL CAMERAS

BACKGROUND OF THE INVENTION

1. Field of the Invention

The present invention relates to a stroboscopic control method used in an electronic still camera, especially, at a frame-recording time at which a frame is recorded in a state in which there is a difference in time between first and second fields.

2. Description of the Related Art

In general, there are the following two exposure control methods using a stroboscope in a general photographing operation.

(1) In a first method, a full constant quantity of light is emitted from the stroboscope without controlling the light quantity, and an exposure amount is controlled by the operating of a diaphragm.

(2) In a second method, an operation of the stroboscope is controlled such that the diaphragm is constant and light reflected from a photographed object is measured to make a quantity of the reflected light constant. This second method is called a so-called automatic stroboscopic system.

Recently, the record of a frame picture image having an excellent quality has been required. In the case of this frame picture image, first and second fields are set to one frame. As a method for inputting this frame, there is a method for inputting and recording the frame picture image constructed by a total of the first and second fields having a time difference of 1/60 second. This method is called a movie frame recording method in the following description. However, a time for inputting the frame picture image is long in this movie frame recording method. Accordingly, there is no field recording method for performing a stroboscopic synchronous operation with respect to the first and second fields. There is a field recording method for performing the stroboscopic synchronous operation with respect to the first or second field. However, this field recording method has a problem that resolution is reduced in the field record.

There is a known movie frame recording method for performing the stroboscopic synchronous operation by using a mechanical shutter. However, in this movie frame recording method, since the mechanical shutter is used, structure and control of the mechanical shutter are complicated. For example, it is necessary to dispose a shutter driver in addition to the mechanical shutter.

As a movie frame recording method without using the mechanical shutter, there is a known method for inputting and recording a movie frame. This method is similar to a method for taking a moving picture in a movie (or a cam coder). However, there is no such method for performing a stroboscopic synchronous operation.

As mentioned above, in the movie frame recording method using a mechanical shutter, it is possible to perform the stroboscopic synchronous operation when a movie frame is recorded, but the structure and control of the mechanical shutter are complicated. In contrast to this, resolution is reduced in the field recording method for performing the stroboscopic synchronous operation with respect to one of the first and second fields. Further, no movie frame recording method without using the mechanical shutter is disclosed.

SUMMARY OF THE INVENTION

It is therefore an object of the present invention to provide a stroboscopic control method in which a stroboscopic synchronous operation at a movie frame recording time is performed without any complicated control mechanism in an electronic still camera and the camera is made compact and a reliable exposure is obtained when a movie frame picture image is recorded.

The above object of the present invention can be achieved by a stroboscopic control method used in an electronic still camera having a stroboscope, a video signal circuit composed of an image pickup element or a charge coupled device, a video signal processing section, an A/D converting section, a timing generator and a frame memory, a trigger timing generator, and a control circuit for controlling operations of the stroboscope, the video signal circuit and the trigger timing generator; the stroboscopic control method comprising the steps of emitting light from the stroboscope in synchronization with video signals of first and second fields so as to provide an exposure with respect to each of the first and second fields of a frame picture image; and controlling exposure amounts for the first and second fields such that these exposure amounts are equal to each other.

Further, to achieve the above object, the present invention also resides in a stroboscopic control method used in an electronic still camera having a stroboscope and a video signal circuit composed of an image pickup element or a charge coupled device, a video signal processing section, an A/D converting section, a timing generator, a frame memory, etc. This stroboscopic control method comprises the steps of emitting light from the stroboscope in synchronization with a video signal so as to provide an exposure with respect to each of first and second fields; and controlling exposure amounts for the first and second fields such that these exposure amounts are equal to each other.

The above stroboscopic control method is concretely realized as follows.

(1) A light emitting amount of the stroboscope is controlled by a time from the beginning of the light emission. Light emitting timing is controlled such that a time for providing half this light emitting amount is equal to a time for completing the exposure with respect to the first field of the image pickup element. The remaining half the light emitting amount is emitted from the stroboscope during an exposure time of the second field.

(2) The stroboscopic light is emitted at one time for an exposure period for each of the first and second fields when an electronic shutter is operated.

(3) When the stroboscopic light is emitted for each of the exposure periods for the first and second fields, the stroboscope automatically emits light in the exposure for the first field and exposure control is performed by controlling a light emitting time of the stroboscope in the exposure for the second field such that a light emitting quantity of the stroboscope for the second field is equal to that for the first field.

(4) A diaphragm or a shutter speed is controlled such that the diaphragm or the shutter speed is smaller than a diaphragm value or a shutter speed value in an exposure condition thereof for providing a suitable exposure without any stroboscope when external light is bright.

Light is emitted from the stroboscope under this exposure condition so as to provide the suitable exposure.

Accordingly, in accordance with the present invention, the following effects can be obtained.

(1) It is necessary to dispose an automatic flashing mechanism with respect to a combination of distance and diaphragm and control a trigger timing when no electronic shutter is operated. However, it is possible to perform a stroboscopic exposure for a frame by first full light emission.

(2) It is necessary to dispose a mechanism for stopping the light emission when the electronic shutter is operated. However, the stroboscopic exposure can be performed at a high shutter speed by using a charged coupled device (CCD) as the image pickup element. Further, Data once recorded are read and again processed so that it is not necessary to use strict timing data.

(3) In the recording operation of a frame picture image in which exposures with respect to the first and second fields are separately performed, the stroboscopic exposure for each of the respective fields is performed such that light quantities of the stroboscope for the first and second fields are equal to each other. Accordingly, it is possible to perform the stroboscopic exposure even when the frame picture image is recorded at a high shutter speed.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of a stroboscopic control method in the present invention will next be described in detail with reference to the accompanying drawings.

Figure 1:
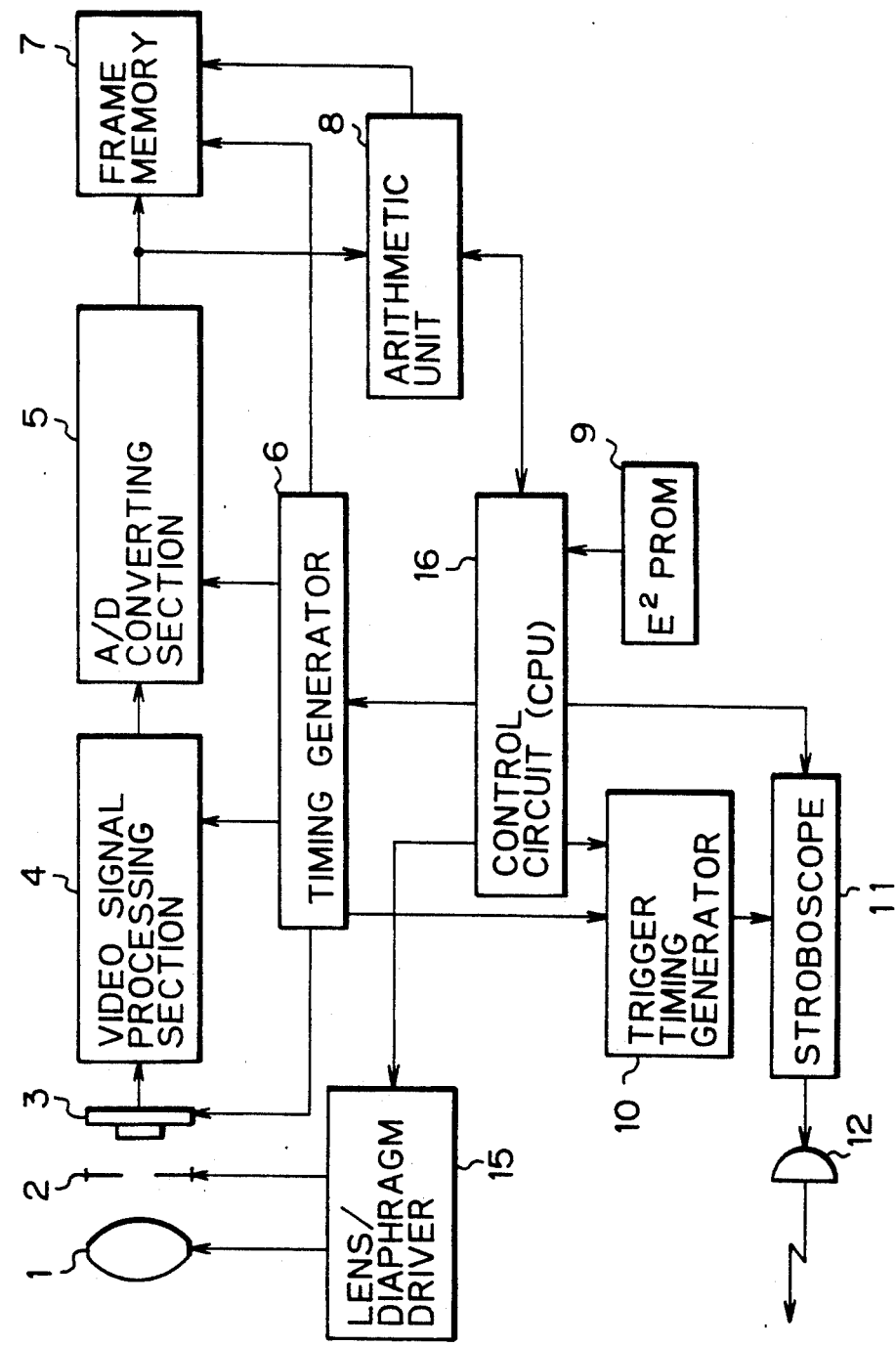
FIG. 1 is a view showing the construction of relative portions of an electronic still camera using a stroboscopic control method in accordance with each of first and second embodiments of the present invention.
Figure 2:
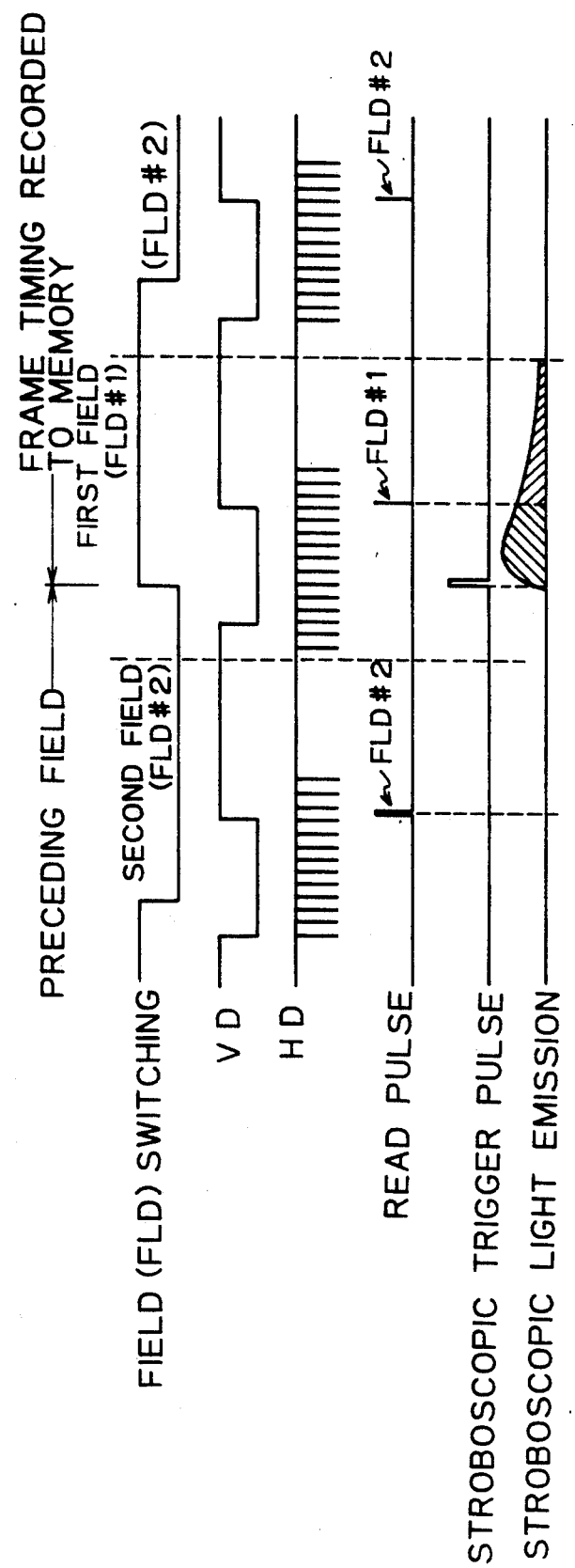
FIG. 2 is a timing chart of electric signals used in the stroboscopic control method in the first embodiment of the present invention.
Figure 3:
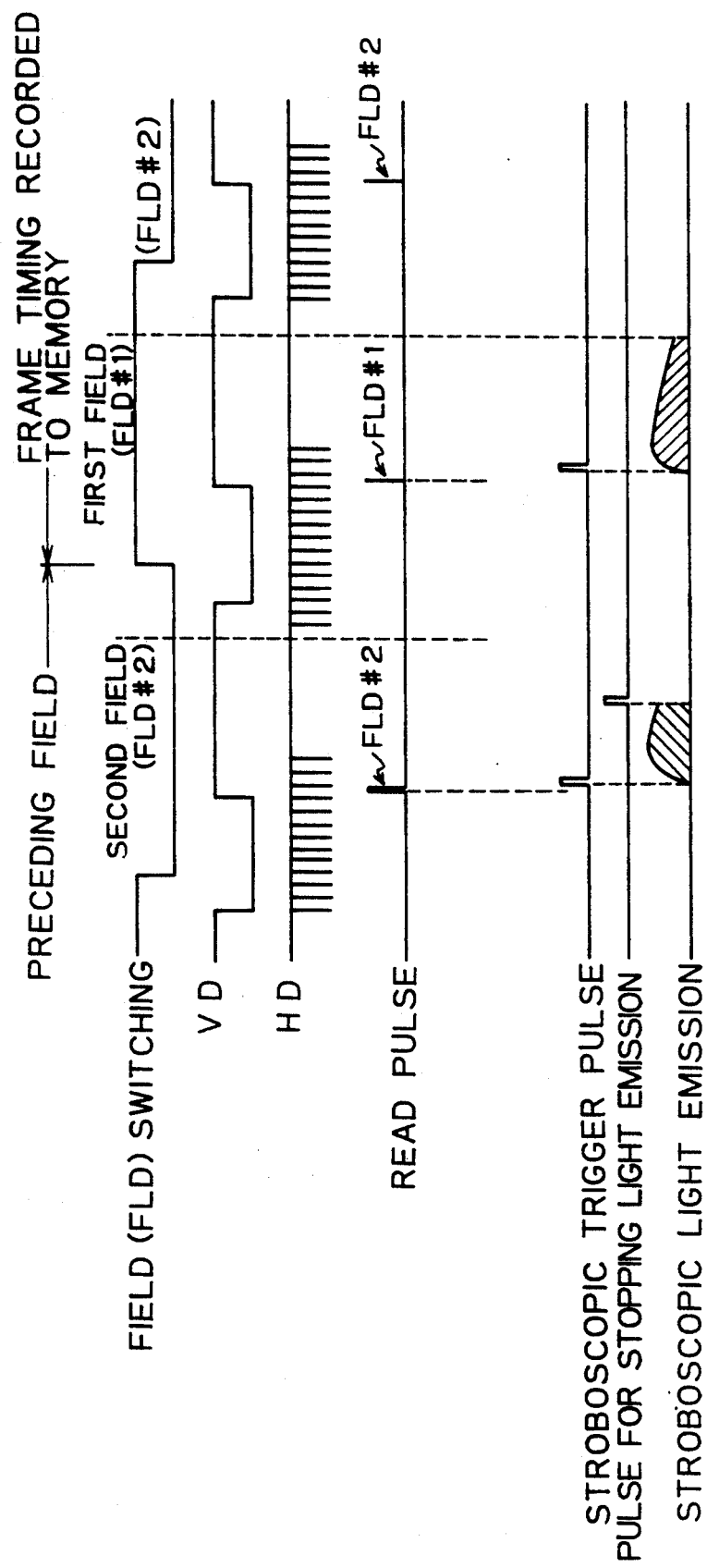
FIG. 3 is a timing chart of electric signals used in the stroboscopic control method in the second embodiment of the present invention.

FIG. 1 is a view showing the construction of relative portions of an electronic still camera using a stroboscopic control method in accordance with each of first and second embodiments of the present invention. FIG. 2 is a timing chart of electric signals used in the stroboscopic control method in the first embodiment of the present invention. FIG. 3 is a timing chart of electric signals used in the stroboscopic control method in the second embodiment of the present invention.

In FIG. 1, reference numerals 1, 2 and 3 respectively designate a lens for taking a picture, a diaphragm and an image pickup element composed of a charge coupled device (CCD). Reference numerals 4, 5, 6 and 7 respectively designate a video signal processing section, an A/D converting section, a timing generator and a frame memory. A video signal circuit is constructed by the image pickup element 3, the video signal processing section 4, the A/D converting section 5, the timing generator 6 and the frame memory 7. Reference numerals 8, 9 and 10 respectively designate an arithmetic unit, a programmable read only memory ($E^2PROM$) electrically rewritable and a stroboscopic trigger timing generator. Further, reference numerals 11, 12, 15 and 16 respectively designate a stroboscope, a light emitting section of the stroboscope, a lens/diaphragm driver and a control circuit (CPU).

An operation of the electronic still camera using the stroboscopic control method in the first embodiment of the present invention will next be described with reference to FIGS. 1 and 2.

The control circuit (CPU) 16 of the electronic still camera starts a charging operation of the stroboscope if a photographing condition of the electronic still camera is equal to a condition for using the stroboscope When a charging voltage level of the stroboscope 11 is equal to or greater than a predetermined voltage level, it is possible to take a picture so that an operating state for allowing the releasing operation of a shutter is set. When an unillustrated first release switch is pushed, an automatic focusing (AF) operation is performed to calculate a distance from the camera to a photographed object. Further, an unillustrated photometric section is operated to measure brightness of the photographed object.

The control circuit (CPU) 16 transmits an electric signal based on automatic focusing data to the lens/diaphragm driver 15 so as to move and focus the lens 1 on an image pickup face of the image pickup element (CCD) 3. If the photographed object is sufficiently dark from photometric results of the photometric section, the control circuit 16 transmits an electric signal to the lens/diaphragm driver 15 such that the diaphragm 2 is moved to provide a diaphragm value calculated from a total quantity of light of the stroboscope (or a guide number) and the distance from the camera to the photographed object. In the meantime, the control circuit (CPU) 16 transmits an electric signal to the timing generator 6 to operate the charge coupled device (CCD) 3 and the video signal processing section 4 so as to stabilize the voltage level of a video signal.

When an unillustrated second release switch for starting a photographing operation is pushed, the stroboscope is charged and the lens and the diaphragm are moved and adjusted in predetermined positions thereof. Thus, the control circuit (CPU) 16 reads trigger timing data of the stroboscope 11 out of the programmable read only memory ($E^2PROM$) 9. The control circuit (CPU) 16 sets a write starting address of the frame memory 7. etc., while the control circuit 16 transmits an electric signal of the timing generator 6 to the A/D converting section 5 and the frame memory 7. Thus, the entire electronic still camera attains an operating state for allowing the photographing operation.

For example, the trigger timing data of the stroboscope are constructed as follows.

(1) A time from a switching point of a second field before a first field to a stroboscopic trigger (2) A time from the switching point of the second field to a stroboscopic trigger between an n-th horizontal drive (HD) signal and an (n+1)-th horizontal drive (HD) signal (3) A time from a switching point of the first field (4) A time from a fall of a vertical drive (VD) signal before the first field to the stroboscopic trigger between the n-th horizontal drive (HD) signal and the (n+1)-th horizontal drive (HD) signal The control circuit (CPU) 16 writes the trigger timing data to the trigger timing generator 10 of the stroboscope at a timing suitable for the trigger timing data in synchronization with an operation of the timing generator 6. The trigger timing generator 10 receives a field (FLD) switching signal, the vertical drive (VD) signal, the horizontal drive (HD) signal and an unillustrated clock signal from the timing generator 6. The trigger timing generator 10 then transmits a stroboscopic trigger signal when the trigger timing data are in conformity with internal timing data of this trigger timing generator provided as a data value from the CPU. As shown in FIG. 2, this stroboscopic trigger signal is preceded by a predetermined time with respect to a moving pulse or a read pulse for field #1 (FLD#1). The stroboscope 11 starts light emission by receiving this stroboscopic trigger pulse. The intensity of stroboscopic light is gradually increased. Thereafter, the intensity of the stroboscopic light is slowly decreased and the stroboscopic light is extinct. While the stroboscopic light is emitted, the read pulse for FLD#1 is generated and a quantity of light stored to a photodiode before this generation is transmitted to a vertical register of the image pickup element (CCD) 3. Image data of this vertical register are written to the frame memory 7 as a video signal for the first field by a pulse from the timing generator 6 after the above light quantity is transmitted to the vertical register.

When the stroboscope once emits light, the light is continuously emitted from the stroboscope after the generation of the read pulse for FLD#1. Thereafter, the light of the stroboscope is extinct. All the stroboscopic light after the generation of the read pulse for FLD#1 are transmitted to the vertical register of the image pickup element (CCD) 3 by the next read pulse for FLD#2 and are read as a video signal for the second field. Then, similar to the above case, this read video signal is written to the frame memory 7. A stroboscopic trigger time can be set such that the area of a hatching portion of the stroboscopic light emission (as shown in FIG. 2) before the generation of the read pulse for FLD#1 is equal to the area of a hatching portion of the stroboscopic light emission after the generation of this read pulse. In this case, it is possible to perform stroboscopic exposures with respect to the first and second fields by one light emission. If timings of the stroboscopic exposures with respect to the first and second fields are greatly shifted from each other, the exposure results of the first and second fields are unbalanced. Accordingly, when images with respect to the first and second fields are read out of the frame memory 7 and are then reproduced, a flicker is caused and the appearance of an obtained picture image is reduced in quality.

Data of a light emitting timing for providing half the light quantity in consideration of dispersions in various constants of the stroboscope are written to the programmable read only memory (E$^2$PROM) 9. The control circuit (CPU) 16 reads and uses data suitable for various conditions of the stroboscopic light emission.

The operation of an electronic still camera using the stroboscopic control method in accordance with the second embodiment of the present invention will next be described with reference to FIGS. 1 and 3. In this case, the explanation of operations of the electronic still camera equal to those described in the first embodiment is omitted in the following description.

In the second embodiment, exposure is started with respect to the first field of a frame recorded just after the generation of a read pulse of the second field before a frame recorded to the frame memory 7. A stroboscopic trigger pulse for the first field is generated in synchronization with this exposure. Before this stroboscopic trigger pulse is generated, the control circuit (CPU) 16 reads data about a stroboscopic light emitting period for the first field from the programmable read only memory (E$^2$PROM) 9. Since an assigned time has passed after the light emission, the control circuit (CPU) 16 transmits a pulse for stopping the stroboscopic light emission and interrupts the light emission of the stroboscope by a well-known method. Thereafter, a first field period is set as shown in FIG. 3. A read pulse of the first field is generated for this first field period and an exposure period for the second field is then set. The stroboscope 11 again generates a light emitting trigger pulse to emit the remaining stroboscopic light after this read pulse of the first field is generated.

Figure 4:
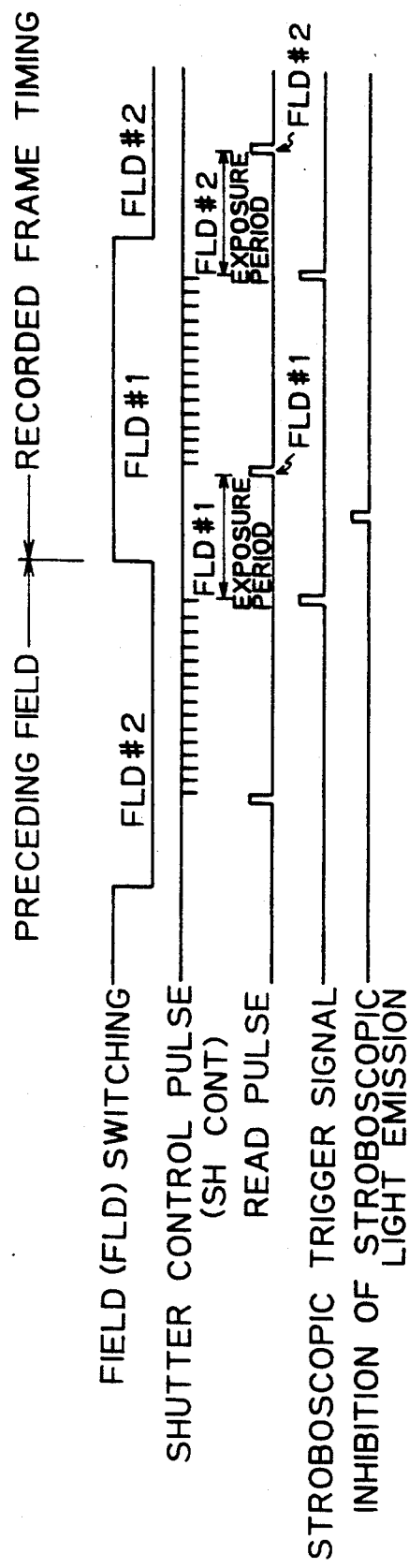
FIG. 4 is a timing chart for explaining the timing of a stroboscopic synchronous signal in the second embodiment of the present invention.

In the stroboscopic control method in the second embodiment of the present invention, when a time for photoelectrically storing a charge to the image pickup element (CCD) 3 is controlled to use the image pickup element such that the image pickup element functions as a shutter, a synchronous operation of the light emission of the stroboscope is performed until a high-speed shutter operation in which this storage time is equal to about a light emitting time of the stroboscope such as 1 to 1.5 ms. Namely, as shown in FIG. 4, the exposure period is set after stoppage of the generation of a shutter control pulse (SH CONT) for resetting a charge stored to a photodiode of the image pickup element (CCD) 3. A stroboscopic trigger pulse is generated after this stoppage. Further, after a predetermined time has passed, a pulse for stopping the light emission (a pulse for inhibiting the stroboscopic light emission) is generated and the stroboscopic exposure for the first field is completed. Next, a read pulse for the first field is generated and a reset period is set by the shutter control pulse (SH CONT). The stroboscope emits light just after an exposure operation for the second field is started since the generation of this pulse (SH CONT) was stopped. In this case, no emission of this stroboscopic light is stopped.

A video signal provided by the exposure operation using the stroboscopic control method in each of the above first and second embodiments is recorded to the frame memory 7 in an order of the first and second fields. At this recording time, the control circuit (CPU) 16 sets a total of operating programs every field after a brightness signal compressed in voltage level by a gamma transformation, etc. is linearly extended in the arithmetic unit 8. This arithmetic unit 8 has total values of the respective fields therein at a time point at which one frame is completely recorded. Accordingly, the control circuit (CPU) 16 transmits commands for providing a ratio of the total values of the respective fields to the arithmetic unit 8. The results of this ratio are transmitted to this control circuit (CPU) 16. When this ratio exceeds a predetermined value, the control circuit (CPU) 16 sets and controls an operation of the timing generator 6 such that a field having a higher voltage level is read and a pulse for transmitting this field to the arithmetic unit 8 is generated. After data in the arithmetic unit 8 are linearly returned by a control operation of the control circuit (CPU) 16, these data are multiplied by a constant coefficient provided by first and second field values. Further, after the multiplied data are compressed by the gamma transformation, etc., the compressed data are again written to the frame memory 7 by the control operation of the control circuit (CPU) 16.

Figure 5:
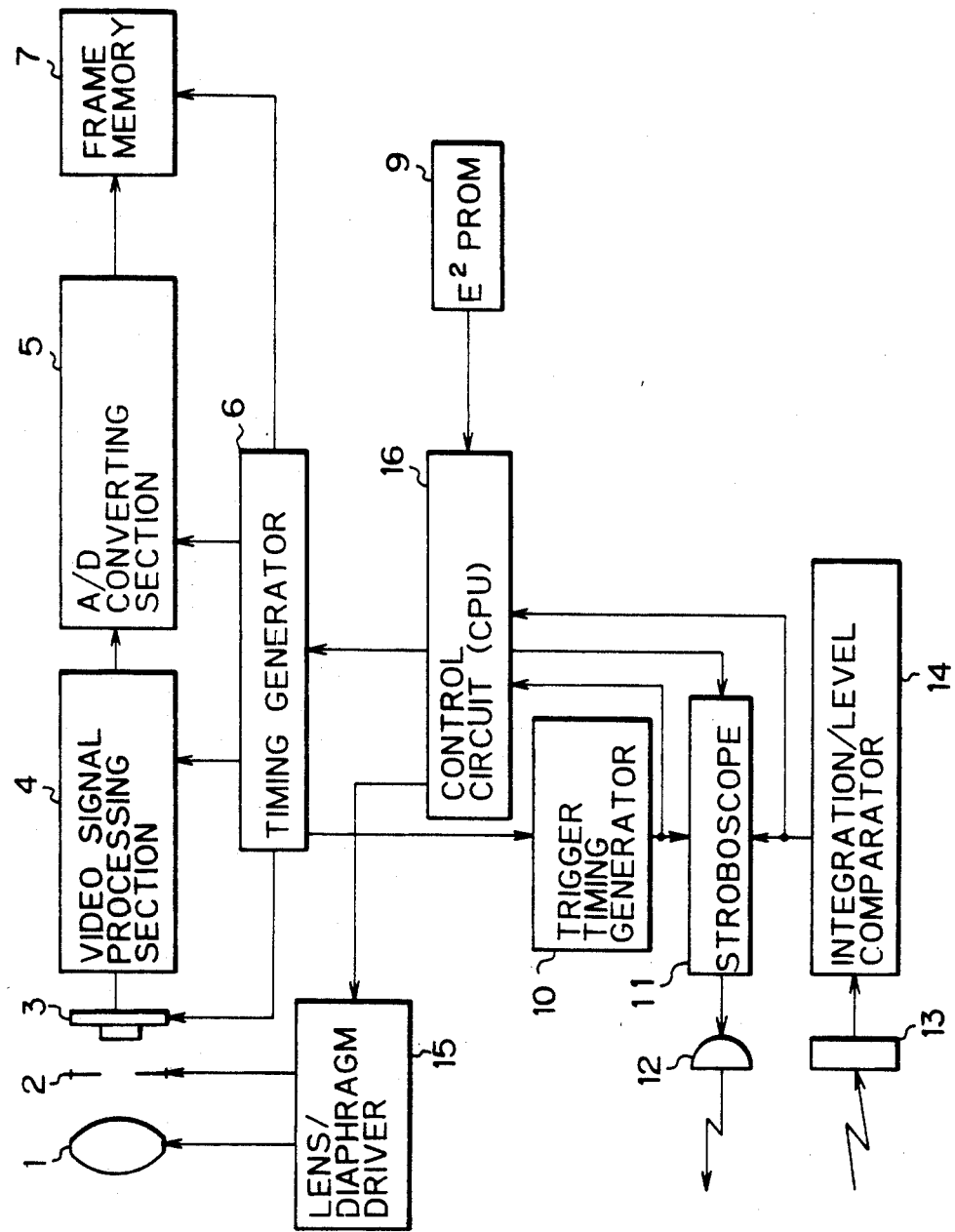
FIG. 5 is a view showing the construction of relative portions of an electronic still camera using a stroboscopic control method in accordance with a third embodiment of the present invention.
Figure 6:
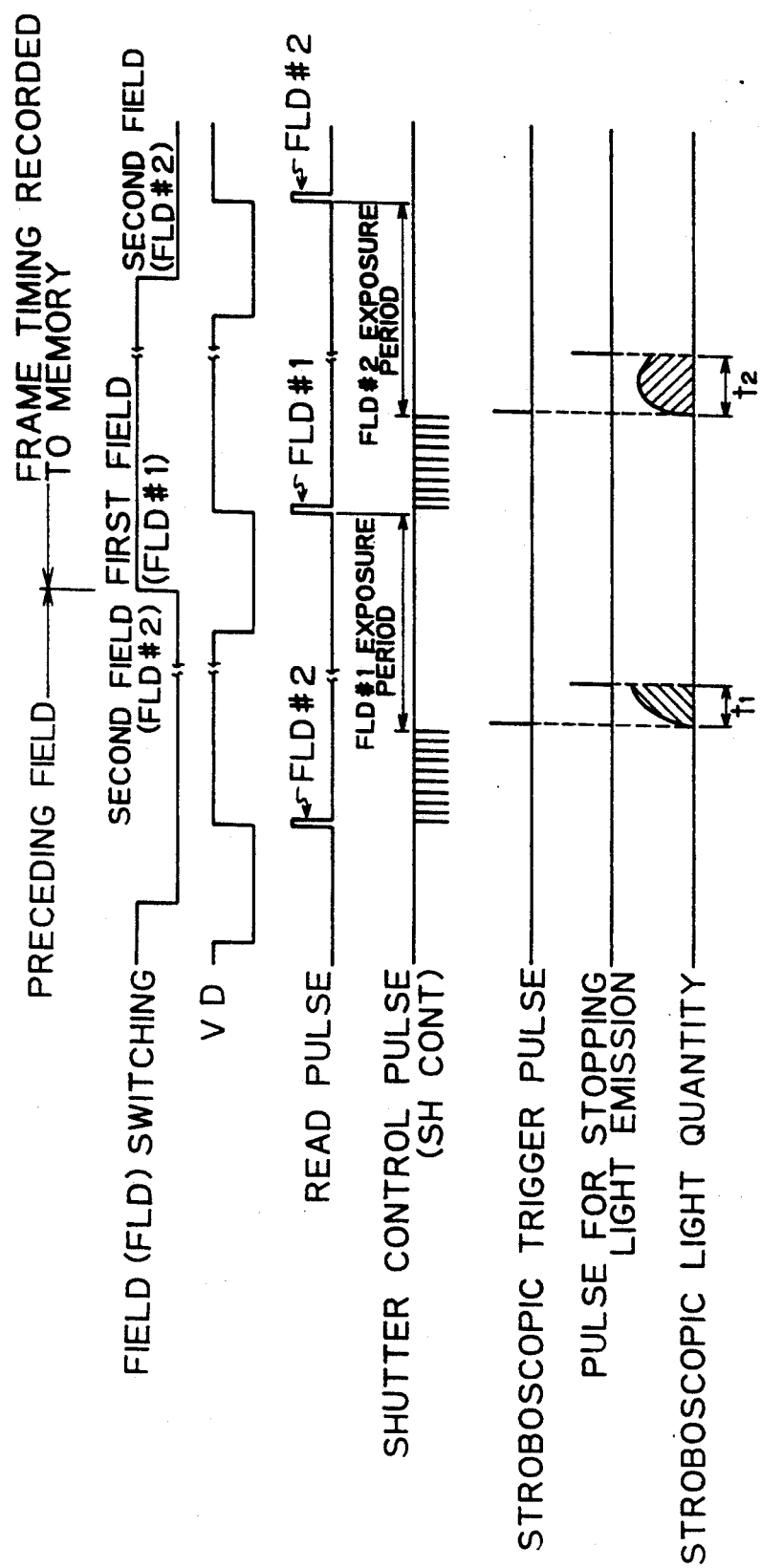
FIG. 6 is a timing chart of electric signals used in the stroboscopic control method in the third embodiment of the present invention.

FIG. 5 is a view showing the construction of relative portions of an electronic still camera using a stroboscopic control method in accordance with a third embodiment of the present invention. FIG. 6 is a timing chart of electric signals used in the stroboscopic control method in the third embodiment of the present invention.

In FIG. 5, a lens 1, a diaphragm 2, an image pickup element (CCD) 3, a video signal processing section 4, an A/D converting section 5, a timing generator 6, a frame memory 7, a programmable read only memory ($E^2$-PROM) 9, a trigger timing generator 10, a stroboscope 11, a light emitting section 12, a lens/diaphragm driver 15 and a control circuit (CPU) 16 are equal to those designated by reference numerals respectively corresponding to the relative portions of the electronic still camera using the stroboscopic control method in each of the first and second embodiments. Reference numerals 13 and 14 respectively designate a light emitting section and an integration/level comparator for integrating a quantity of received light and comparing voltage levels with each other.

An operation of the electronic still camera using the stroboscopic control method in the above third embodiment will next be described with reference to FIGS. 5 and 6.

(1) A control circuit (CPU) 16 of the camera starts the charging operation of the stroboscope 11 when a condition for taking a picture in the camera is equal to a condition for using the stroboscope. When a charging voltage level of the stroboscope 11 is equal to or greater than a predetermined voltage level, it is possible to take a picture so that an operating state for allowing the releasing operation of a shutter is set. When an unillustrated first release switch of the camera is pushed, an automatic focusing (AF) operation is performed to calculate a distance from the camera to a photographed object. Further, an unillustrated photometric section is operated to measure brightness of the photographed object. The control circuit (CPU) 16 transmits an electric signal based on automatic focusing data to the lens/diaphragm driver 15 so as to move and focus the lens 1 on an image pickup face of the image pickup element (CCD) 3. If the photographed object is sufficiently dark from photometric results of the photometric section and the condition for using the stroboscope is satisfied, the control circuit (CPU) 16 transmits an electric signal to the lens/diaphragm driver 15 such that the diaphragm 2 is moved to provide a diaphragm value for the automatic stroboscope. In the meantime, the control circuit (CPU) 16 transmits an electric signal to the timing generator 6 to operate the image pickup element 3 and the video signal processing section 4 so as to stabilize the voltage level of a video signal.

(2) Just after the above first releasing operation, the control circuit (CPU) 16 detects the charging voltage level of the stroboscope 11 under the condition for using the stroboscope. The next operation of the camera is not performed when this charging voltage level is equal to or greater than a first predetermined voltage level, but is equal to or smaller than a second predetermined voltage level. In this case, a capacitor for light emission is charged until the charging voltage level of the stroboscope 11 is equal to or greater than the second voltage level. When the charging voltage level is equal to or greater than the second voltage level and the first release button is pushed, a distance measuring operation (the automatic focusing operation) and a photometric operation are performed. As a result, the charging voltage level of the stroboscope at a photographing time after a second releasing operation of the shutter described later is close to the second voltage level at any time so that it is easy to control a quantity of light emitted from the stroboscope. The stroboscope is normally charged until the first voltage level when the condition for using the stroboscope is satisfied. A time required to increase the charging voltage level of the stroboscope until the first voltage level is very long in comparison with a time required from the first voltage level to the second voltage level. Accordingly, photographing timing is lost when the stroboscope is charged from a voltage level before the first voltage level every light emission at a timing after the first releasing operation. Therefore, the stroboscope is charged until the first voltage level before the first releasing operation and is charged until the second voltage level after the first releasing operation.

(3) When an unillustrated release button for starting a photographing operation is pushed, the control circuit (CPU) 16 allows the timing generator 6 to generate a trigger signal for the stroboscope. While the control circuit (CPU) 16 transmits an electric signal from the timing generator 6 to the A/D converting section 5 and the frame memory 7, the control circuit (CPU) 16 sets a write starting address of the frame memory 7, etc. Thus, the entire electronic still camera attains an operating state for allowing the photographing operation. Thereafter, a shutter control pulse shown in FIG. 6 and inhibiting the storage of a charge for a picture image to the image pickup element (CCD) 3 is generated after the generation of a charge read pulse of a second field shown in FIG. 6 before a photographing frame recorded to the frame memory. In the meantime, no charge is stored to each of picture elements of the image pickup element (CCD) 3. A stroboscopic trigger pulse is generated after the generation of this shutter control pulse is stopped, thereby starting light emission of the stroboscope 11. In a normal light-adjusting system of the automatic stroboscope, the light emission is stopped by generating a stopping pulse of the light emission when the light receiving section 13 receives light reflected from the photographed object and a photoelectric current is integrated by the integration/level comparator 14 and a voltage level of the integration/level comparator 14 is equal to a predetermined voltage level. Next, when an exposure operation for the first field is completed, a read pulse is generated and a picture image is sequentially outputted from the image pickup element (CCD) 3 to the video signal processing section 4. In the meantime, an exposure operation for the second field is performed on an image pickup face of the image pickup element (CCD) 3. Similar to the case of the first field, a shutter control pulse is generated and a stroboscopic trigger pulse for the second field is generated after the generation of the shutter control pulse is completed.

Thus, light is emitted from the stroboscope 11 and the light emission is again stopped in accordance with a quantity of light reflected from the photographed object. Thereafter, a read pulse for the second field is generated and the above exposure operation for the second field is completed. Thus, the stroboscopic exposure for a frame picture image is completed by automatically emitting light from the stroboscope with respect to each of the first and second fields.

(4) When the stroboscopic exposure is performed and the photographed object is bright without using the stroboscope (in so-called daytime synchronization, which is to use the stroboscope in counter-light), a diaphragm or a shutter speed in use of the stroboscope is set to a value under 1 EV (exposure value) in suitable exposure conditions of the shutter speed and the diaphragm when no stroboscope is used. Thus, the exposure is suitably performed in conformity with the stroboscopic light emission. When the diaphragm is changed, no F-number (or F-value level) for adjusting the stroboscopic light quantity at the shutter speed is changed. In this state, a quantity of light except for the stroboscopic light is reduced by reducing the diaphragm by one stage. When a light-adjusting voltage level of the stroboscopic light before the reduction of the diaphragm is provided as a reference voltage level of the integration/level comparator 14 for integrating reflected light, a reduced quantity of the stroboscopic light provided by the reduced diaphragm in the light adjustment is transmitted onto the image pickup face of the image pickup element (CCD) 3. Accordingly, a total stroboscopic light quantity is set to a light quantity suitable for the stroboscopic exposure. In contrast to this, when the shutter speed is increased by one stage, no diaphragm aperture is changed and the voltage level of the stroboscope for the light-adjusting F-number is provided as the reference voltage level of the integration/level comparator 14 such that this voltage level of the stroboscope is reduced by one stage. At this time, a quantity of light except for the stroboscopic light is reduced by the increase in shutter speed. Accordingly, the stroboscopic light quantity is provided such that the reference voltage level of the integration/level comparator 14 is reduced in a state in which the diaphragm is opened by one stage. Thus, the stroboscopic light quantity is set to be suitably adjusted in accordance with the reduced reference voltage level of the integration/level comparator 14. The light-adjusting F-number is the value of light reflected from the photographed object when the stroboscope is used.

(5) Light is similarly emitted from the automatic stroboscope at an exposure time with respect to the first field described in the above item (3). The control circuit (CPU) 16 measures a time $t_1$ shown in FIG. 6 from a trigger of the stroboscope at this exposure time to the stoppage of the light emission. As explained in the above item (2), the stroboscope emits light after the stroboscope is charged until the second voltage level. Accordingly, a charging voltage level of a capacitor for the light emission is controlled in a predetermined narrow range when the light emission of the stroboscope is started. Therefore, the charging level of a voltage left in the capacitor after the stoppage of the light emission is definitely determined if a first light emitting time is known. From this charging voltage level, it is possible to determine a light emitting time required for the next light emission and providing a light quantity equal to that in the first light emission. Therefore, the control circuit (CPU) 16 measuring the first light emitting time reads data of the corresponding second light emitting time out of the programmable read only memory ($E^2$-PROM) 9 until the second light emission. Thereafter, similar to the first light emission, light emission of the stroboscope is started at a second light emitting timing. In this case, the light emission of the stroboscope is not automatically stopped, but the control circuit (CPU) 16 reads the second light emitting timing. Then, the control circuit (CPU) 16 transmits a pulse for stopping the light emission after a data time for reading the above data out of the programmable read only memory ($E^2$-PROM) 9 has passed.

(6) In the case of the normal automatic stroboscopic operation at the first automatic light emission, light is emitted from the stroboscope by using all energy of the charged capacitor for light emission in accordance with a condition of the photographed object. However, in this embodiment, the light is emitted two times from the stroboscope at any time. In this case, an energy amount of the capacitor usable in the first light emission is determined in advance and can be controlled by the light emitting time. Namely, the control circuit (CPU) 16 performs a time counting operation from the generation of a first trigger. When this counted time is equal to the time for reading the above data out of the programmable read only memory ($E^2$PROM) 9 in advance, the light emission of the stroboscope is stopped by a control operation of the control circuit (CPU) 16 without stopping the operation of the automatic stroboscope. Thus, the energy amount of the capacitor for the second light emission is secured. When the light emitting quantity of the stroboscope is insufficient, an obtained picture image is dark, but there is no problem except for this darkness. When the light quantities in the first and second light emissions are unbalanced, flicker is caused on the screen so that the quality of the obtained image is reduced.

The following effects can be obtained as clearly seen from the above first to third embodiments of the present invention.

(1) It is possible to perform a stroboscopic exposure for a frame by one full light emission since an automatic flashing mechanism is disposed and trigger timing is controlled in time.

(2) Since a mechanism for stopping the light emission is further disposed, the stroboscopic exposure can be performed at a high shutter speed by using a charge coupled device (CCD).

(3) Data once recorded are read and again processed by using a frame memory. Accordingly, it is not necessary to use strict timing data and an application range of data after-treatment thereof is increased. For example, a wide brightness range is narrowed by rewriting a gamma transformation table.

(4) Light quantities of the stroboscope for first and second fields are set to be equal to each other in a stroboscopic exposure when a frame picture image is recorded. Accordingly, it is possible to perform the stroboscopic exposure even when the frame picture image is recorded at a high shutter speed by controlling a time for storing a photoelectric current using the charge coupled device (CCD).

Many widely different embodiments of the present invention may be constructed without departing from the spirit and scope of the present invention. It should be understood that the present invention is not limited to the specific embodiments described in the specification, except as defined in the appended claims.

What is claimed is:

1. A stroboscopic control method used in an electronic still camera for recording a frame picture image one frame of which has a first field and a second field, said first field and said second field being changed alternatively every determined time period comprising the steps of:
   setting a full quantity of stroboscopic light emission as a function of a time from a beginning of a stroboscopic light emission;
   calculating a time when said stroboscopic light emission is half of said set full quantity of stroboscopic light emission;
   generating a first read pulse for starting a transmission of electric charges of said first field from a photodiode to a vertical register in a charge coupled device;
   generating a second read pulse for starting a transmission of electric charges of said second field from said photodiode to said vertical register in said charge coupled device;
   generating a stroboscopic trigger pulse for starting said stroboscopic light emission; and
   synchronizing said stroboscopic trigger pulse, said first read pulse and said second read pulse in such a manner that one of said first read pulse and said second read pulse is equivalent to said calculated time.

2. A stroboscopic control method according to claim 1, wherein:
   said determined time period is 1/60 second.

3. A stroboscopic control method according to claim 2, further comprising the steps of:
   transmitting said electric charges to a horizontal register, converting said transmitted electric charges to digital signals and writing said digital signals in a frame memory.

4. A stroboscopic control method according to claim 3, further comprising the steps of:
   processing said written digital signals and reading said processed digital signals out of said frame memory.

5. A stroboscopic control method according to claim 1, further comprising the step of:
   correcting said fully quantity of stroboscopic light emission as a function of time.

6. A stroboscopic control method used in an electronic still camera for recording a frame picture image one frame of which has a first field and a second field, said first field and said second field being changed alternatively every determined time period, comprising the steps of:
   setting a full quantity of stroboscopic light emission as a function of a time from a beginning of a stroboscopic light emission;
   calculating a time when said stroboscopic light emission is half of said set full quantity of stroboscopic light emission;
   generating a first read pulse for starting a transmission of electric charges of said first field from a photodiode to a vertical register in a charge coupled device;
   generating a second read pulse for starting a transmission of electric charges of said second field from said photodiode to said vertical register in said charge coupled device;
   generating a first stroboscopic trigger pulse for starting said stroboscopic light emission;
   generating an interrupting pulse for interrupting said stroboscopic light emission at said calculated time;
   generating a second stroboscopic trigger pulse for restarting said interrupted stroboscopic light emission; and
   synchronizing said first read pulse, said second read pulse, said first stroboscopic trigger pulse and said second stroboscopic trigger pulse in such a manner that said stroboscopic light emission started by said first stroboscopic trigger pulse exposes one of said first field and second field, and that said stroboscopic light emission started by said second stroboscopic trigger pulse exposes the other of said first field and second field.

7. A stroboscopic control method according to claim 6, wherein:
   said determined time period is 1/60 second.

8. A stroboscopic control method according to claim 6, further comprising the steps of:
   transmitting said electric charges to a horizontal register;
   converting said transmitted electric charges to digital signals; and
   writing said digital signals in a frame memory.

9. A stroboscopic control method according to claim 8, further comprising the steps of:
   processing said written digital signals; and
   reading said processed digital signals out of said frame memory.

10. A stroboscopic control method according to claim 6, further comprising the step of:
    correcting said full quantity of stroboscopic light emission as a function of a time.

11. A stroboscopic control method used in an electronic still camera for recording a frame picture image one frame of which has a first field and a second field, said first field and said second field being changed alternatively every determined time period, comprising the steps of:
    generating a first read pulse for starting a transmission of electric charges of said first field from a photodiode to a vertical register in a charge coupled device;
    generating a second read pulse for starting a transmission of electric charges of said second field from said photodiode to said vertical register in said charge coupled device;
    generating a first stroboscopic trigger pulse for starting a stroboscopic light emission by an automatic stroboscope thereby to expose one of said first field and said second field;
    generating a second stroboscopic trigger pulse for restarting said stroboscopic light emission thereby to expose the other of said first field and said second field; and
    synchronizing said first read pulse, said second read pulse, said first stroboscopic trigger pulse and said second stroboscopic trigger pulse in such a manner that quantity of said stroboscopic light emission started by said first stroboscopic trigger pulse equals to quantity of stroboscopic light emission started by said second stroboscopic trigger pulse.

12. A stroboscopic control method according to claim 11, wherein:
    said determined time period is 1/60 second.

13. A stroboscopic control method according to claim 11, further comprising the steps of:
- transmitting said electric charges to a horizontal register;
- converting said transmitted electric charges to digital signals; and
- writing said digital signals in a frame memory.

14. A stroboscopic control method according to claim 13, further comprising the steps of:
- processing said written digital signals; and
- reading said processed digital signals out of said frame memory.

15. A stroboscopic control method according to claim 11, wherein:
- said quantity of said stroboscope light emission by automatic stroboscope is less than a full quantity of stroboscopic light emission.

16. A stroboscopic control method according to claim 11, further comprises the step of:
- generating a shutter control pulse for limiting an exposure period of each of said first field and said second field.

17. A stroboscopic control method used in an electric still camera for recording a frame picture image one frame of which has a first field and second field, said first field and said second field being changed alternatively every determined period comprising the steps of:
- generating a first read pulse for starting a transmission of electric charges of said first field from a photodiode to a vertical register in a charged coupled device;
- generating a second read pulse for starting a transmission of electric charges of said second field from said photodiode to said vertical register in said charge coupled device;
- generating a first stroboscopic trigger pulse for starting a first stroboscopic light emission by an autostroboscope thereby to expose said first field;
- generating a second stroboscopic trigger pulse for starting a second stroboscopic light emission by said autostroboscope thereby to expose said second field; and
- synchronizing said first read pulse, said second read pulse, said first stroboscopic trigger pulse and said second stroboscopic trigger pulse in such a manner that an exposure amount of said first field by said first stroboscopic light emission equals to an exposure amount of said second field by said second stroboscopic light emission.

18. A stroboscopic control method according to claim 17, wherein:
- said determined time period is 1/60 second.

19. A stroboscopic control method according to claim 17, further comprising the steps of:
- transmitting said electric charges to a horizontal register;
- converting said transmitted electric charges to digital signals; and
- writing said digital signals in a frame memory.

20. A stroboscopic control method according to claim 19, further comprising the steps of:
- processing said written digital signals; and
- reading said processed digital signals out of said frame memory.

21. A stroboscopic control method according to claim 17, further comprises the step of:
- generating a shutter control pulse for limiting an exposure period of each of said first field and said second field.

* * * * *

UNITED STATES PATENT AND TRADEMARK OFFICE
CERTIFICATE OF CORRECTION

PATENT NO. : 5,229,856
DATED : July 20, 1993
INVENTOR(S) : SHINICHIROU KOSHIISHI It is certified that error appears in the above-identified patent and that said Letters Patent is hereby corrected as shown below:

Column 11, line 35, change "2," to --1,--.

Signed and Sealed this

Ninth Day of May, 1995

*Attest:*

BRUCE LEHMAN

*Attesting Officer*   Commissioner of Patents and Trademarks